United States Patent [19]
Morishita et al.

[11] Patent Number: 5,251,741
[45] Date of Patent: Oct. 12, 1993

[54] CARRYING APPARATUS HAVING CARRIER LEVITATED BY MAGNETIC FORCE

[75] Inventors: Mimpei Morishita; Masakuni Akashi; Noriko Kasahara, all of Tokyo, Japan

[73] Assignee: Kabushiki Kaisha Toshiba, Kawasaki, Japan

[21] Appl. No.: 904,674

[22] Filed: Jun. 26, 1992

[30] Foreign Application Priority Data

Jun. 28, 1991 [JP] Japan .................................. 3-183671
Jun. 28, 1991 [JP] Japan .................................. 3-183741
Jun. 28, 1991 [JP] Japan .................................. 3-183755

[51] Int. Cl.$^5$ .............................................. B65G 15/58
[52] U.S. Cl. ................................. 198/690.1; 414/793.3
[58] Field of Search .................... 221/261; 198/690.1, 198/350, 679; 414/606, 793.3

[56] References Cited

FOREIGN PATENT DOCUMENTS 230921 12/1984 Japan .................. 198/690.1
1-133840 5/1989 Japan .

*Primary Examiner*—Robert P. Olszewski
*Assistant Examiner*—Kenneth Noland
*Attorney, Agent, or Firm*—Oblon, Spivak, McClelland, Maier & Neustadt

[57] ABSTRACT

A carrying apparatus having a carrier levitated by a magnetic force. The carrier is movably arranged on the track surface of a track path. A plurality of permanent magnets for generating along the track surface a magnetic field having a predetermined magnetic flux distribution pattern in a direction perpendicular to the extending direction of the track path are provided on the track path. A superconductor element is mounted in the carrier. The superconductor element traps (pins) the magnetic flux of the magnetic field which is applied during transition from the normal conducting state to the superconducting state. The superconductor element supplies a levitating force and a guide force acting in a direction perpendicular to the extending direction of the track path to the carrier by the magnetic force generated between the trapped magnetic flux and the magnetic field generated by the permanent magnets on the track path. The stator of a linear induction motor and magnetic plate which supplies a moving force to the carrier in the direction of the track path in the non-contact manner are provided below the track surface of the track path.

26 Claims, 14 Drawing Sheets

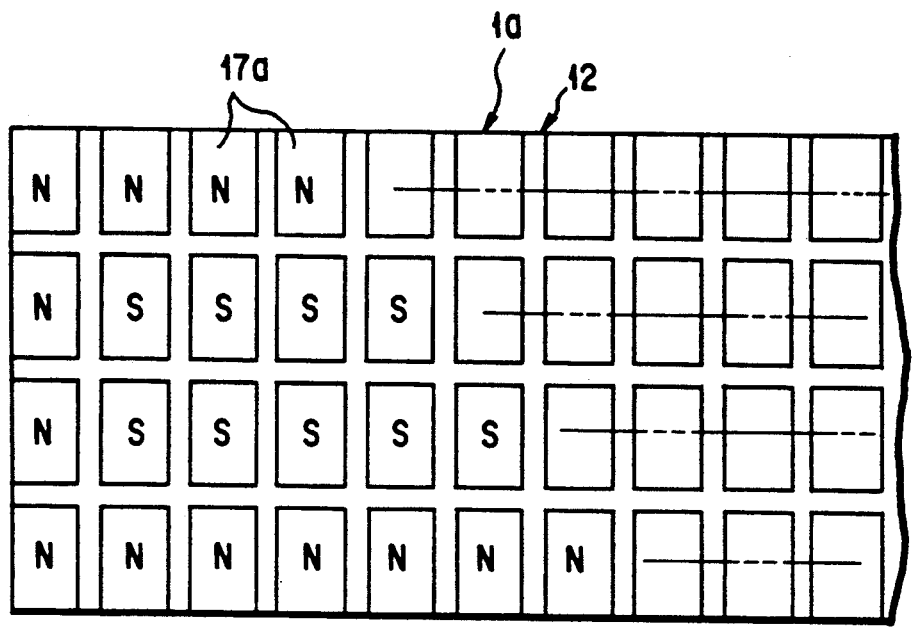
F I G. 10
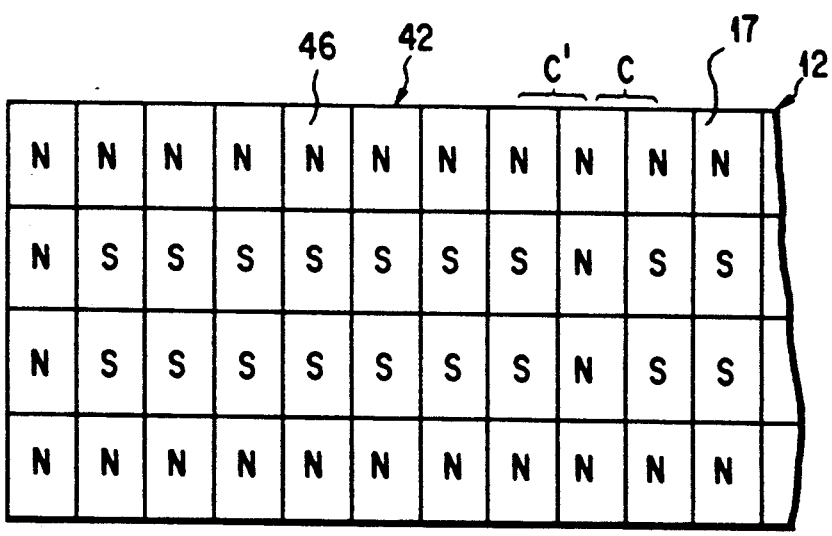
F I G. 12

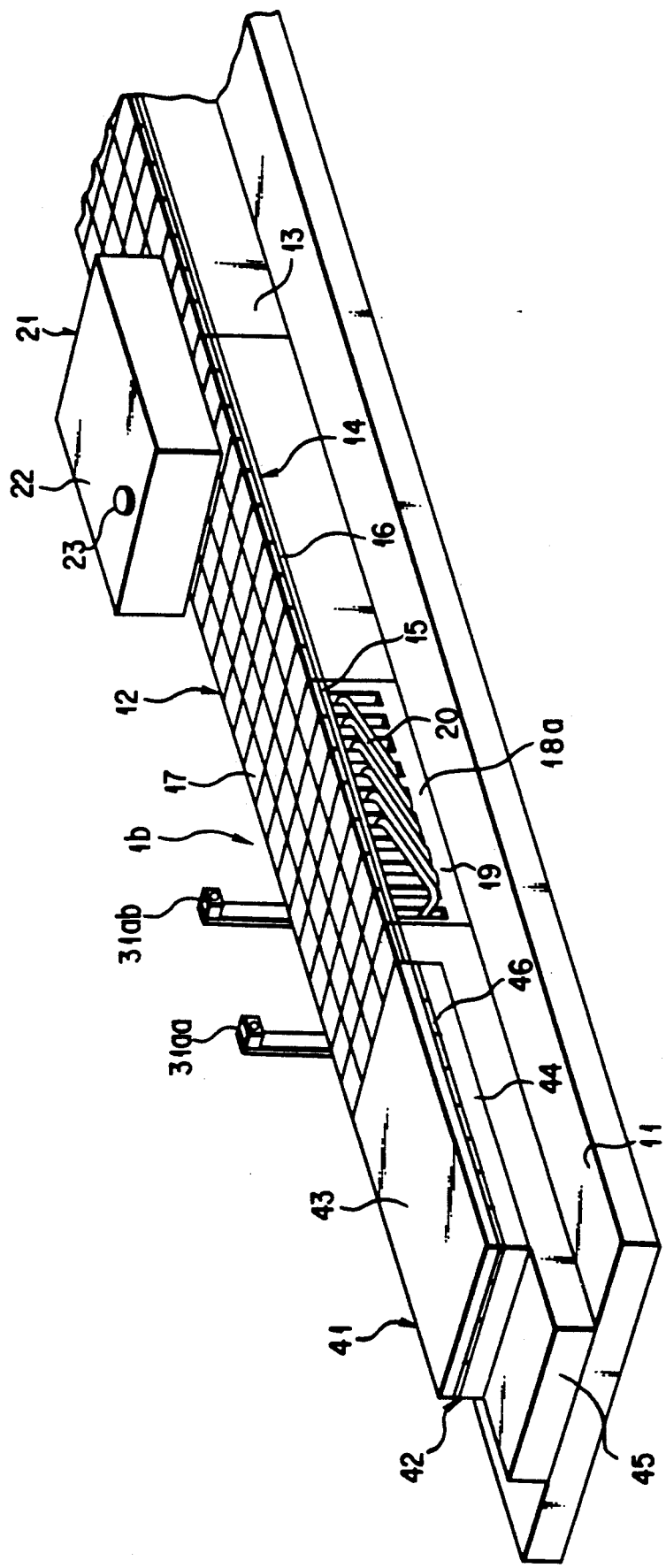
F I G. 11

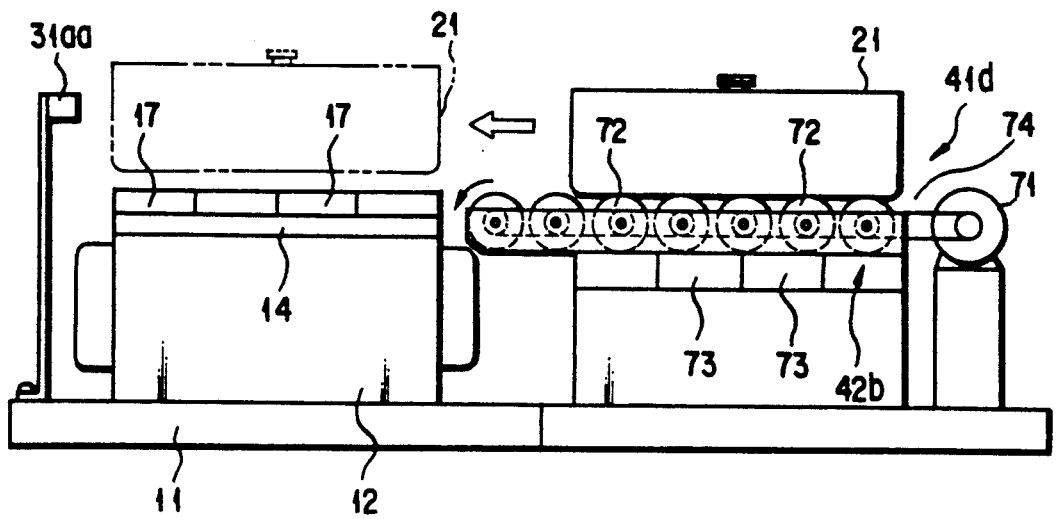
F I G. 16
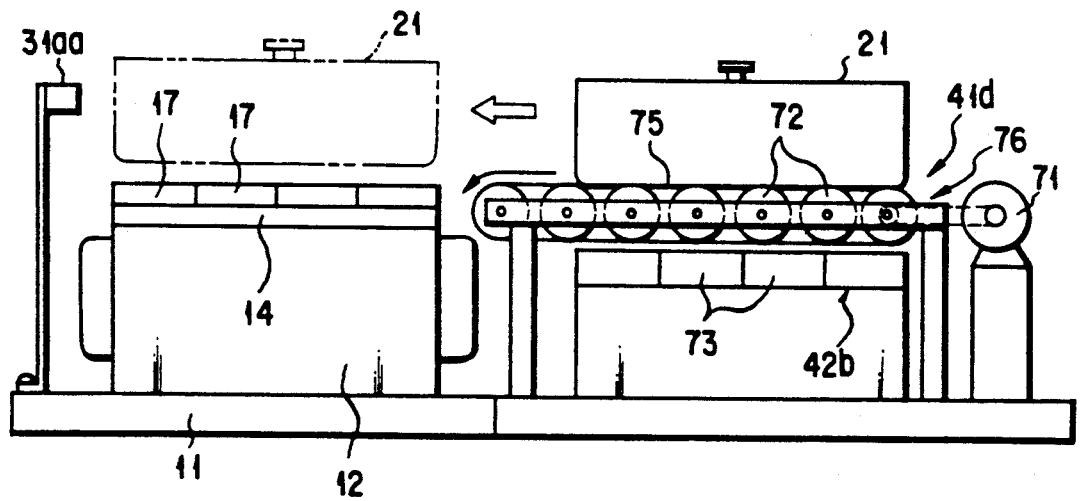
F I G. 17
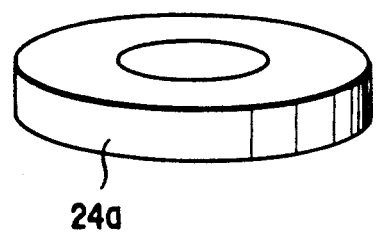
F I G. 18

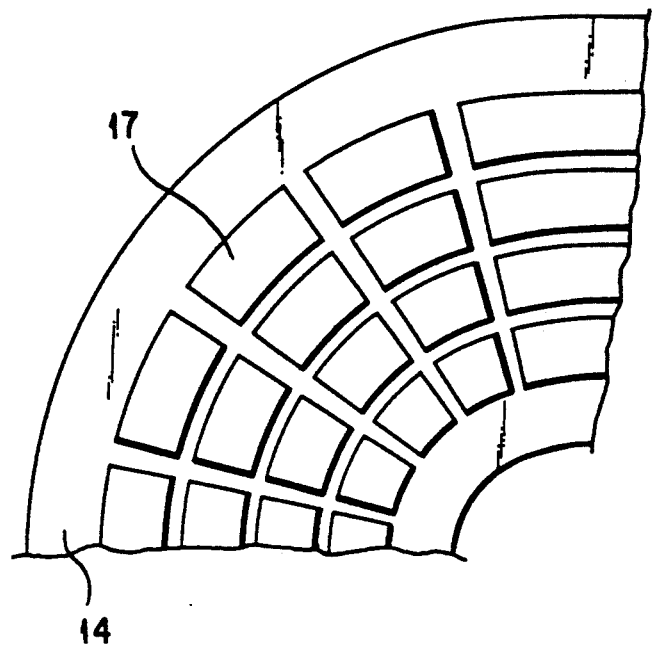
F I G. 19A
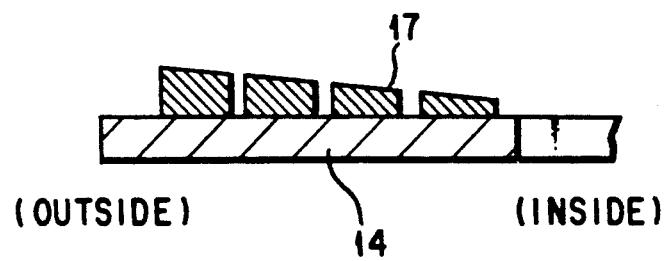
F I G. 19B

CARRYING APPARATUS HAVING CARRIER LEVITATED BY MAGNETIC FORCE

BACKGROUND OF THE INVENTION

Field of the Invention

The present invention relates to a carrying apparatus and, more particularly, to a carrying apparatus having a carrier levitated by a magnetic force.

Description of the Related Art

A carrying apparatus used in an ultraclean space, e.g., a clean room, is required not to generate dust during operation. Accordingly, in the carrying apparatus used in such a clean atmosphere, a carrier is desired to travel in a complete non-contact manner. To cause the carrier to travel in the completely non-contact manner, the carrier must be levitated above the track path by some means, and a propelling force must be supplied to the carrier in the non-contact manner.

Several methods are available for levitating the carrier along the track path. Generally, methods of levitating the carrier by a magnetic force are employed. The methods of levitating the carrier by the magnetic force are classified into a method requiring high-precision control and a method not requiring control at all. The latter contributes to facilitation of design, manufacture, and maintenance/inspection of the carrying apparatus.

In a carrying apparatus disclosed in Published Unexamined Japanese Patent Application No. 1-133840, magnetic levitation of a carrier is realized without requiring levitation control. In the carrying apparatus described in Published Unexamined Japanese Patent Application No. 1-133840, a superconductor element which is set in the superconducting state when set at a temperature of liquid nitrogen or below is mounted in the carrier, and the carrier is levitated by utilizing the Meissner effect of this superconductor element. More specifically, in this carrying apparatus, the carrier is levitated by a magnetic repulsive force generated between the superconductor element mounted in the carrier and a magnetic field generating unit provided to the track path. A coil array is provided to the track path. The superconductor element is magnetically trapped between magnetic poles generated by exciting the respective coils. The propelling force is supplied to the carrier by sequentially switching excitation of the respective coils to shift the trapping positions.

However, in the carrying apparatus having the arrangement described above, since the carrier is levitated and guided by utilizing the Meissner effect of the superconductor element, it is difficult to obtain a large guide force for traveling the carrier along the track path. Hence, when an external force, e.g., the centrifugal force, is applied to the carrier, the carrier can easily deviate from the track path, thus lacking travel stability. When the width of the superconductor element is larger than that of the levitating magnetic field applied from the track path, the magnetic guide force cannot be applied to the carrier. Thus, the carrying apparatus lacks the variety in applications. When the center of gravity of the carrier is deviated by a load or the like, it is difficult to maintain a predetermined levitation posture.

SUMMARY OF THE INVENTION

It is an object of the present invention to provide a highly applicable carrying apparatus which can stably levitate a carrier by a magnetic force without requiring control and which can stably cause the carrier to travel in a non-contact manner even when an external force is applied to the carrier.

According to an aspect of the present invention, a carrier is movably arranged on the track surface of a track path. A plurality of permanent magnets for generating along the track surface a magnetic field having a predetermined magnetic flux distribution pattern in a direction perpendicular to the extending direction of the track path is provided on the track path. A superconductor element is mounted in the carrier. The superconductor element traps (Pinning) the magnetic flux of the magnetic field which is applied during transition of the normal conducting state to the superconducting state. The superconductor element supplies a levitating force and a guide force acting in a direction perpendicular to the extending direction of the track path to the carrier by the magnetic force generated between the trapped magnetic flux and the magnetic field generated by the permanent magnets on the track path. The stator of a linear induction motor which supplies a moving force to the carrier in the direction of the track path in the non-contact manner is provided below the track surface of the track path.

According to the present invention, the carrier is levitated and held at a position where the density of the magnetic flux trapped by the superconductor element mounted in the carrier and the density of the magnetic flux supplied by the permanent magnets on the track path coincide substantially with each other. That is, a stable levitating force and a large guide force can be caused to act on the carrier by the magnetic force between the magnetic flux trapped by the superconductor element and the magnetic field generated by the permanent magnets on the track path. Hence, the carrier can be constantly stably levitated and simultaneously stably traveled. The levitating state is not influenced by the direction of gravity at all. Thus, for example, even if the track path is located at an upper portion and the carrier is located below the track path to face the track path, a stable levitating force and a large guide force can be caused to act on the carrier. As a result, the carrier can be constantly stably levitated and traveled regardless of the gravitational field or null gravitational field.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 10 is a plan view partially showing the path surface of a track path of a carrying apparatus according to the second embodiment of the present invention;

FIG. 11 is a perspective view showing the main part of a carrying apparatus according to the third embodiment of the present invention;

FIG. 12 is a plan view showing a permanent magnet group, provided on a pinning processing mechanism incorporated in the carrying apparatus shown in FIG. 11, for generating a pinning magnetic field;

FIG. 16 is a side view showing another arrangement of a pinning processing mechanism;

FIG. 17 is a side view showing still another arrangement of a pinning processing mechanism;

FIG. 18 is a perspective view showing a modification of the shape of a superconductor element mounted in the carrier;

FIG. 19A is a plan view, showing a modification of a bent portion of the track path; and FIG. 19B is a cross sectional view, showing another modification of the bent portion of the track path.

DETAILED DESCRIPTION OF THE PREFERRED EMBODIMENTS

Figure 1:
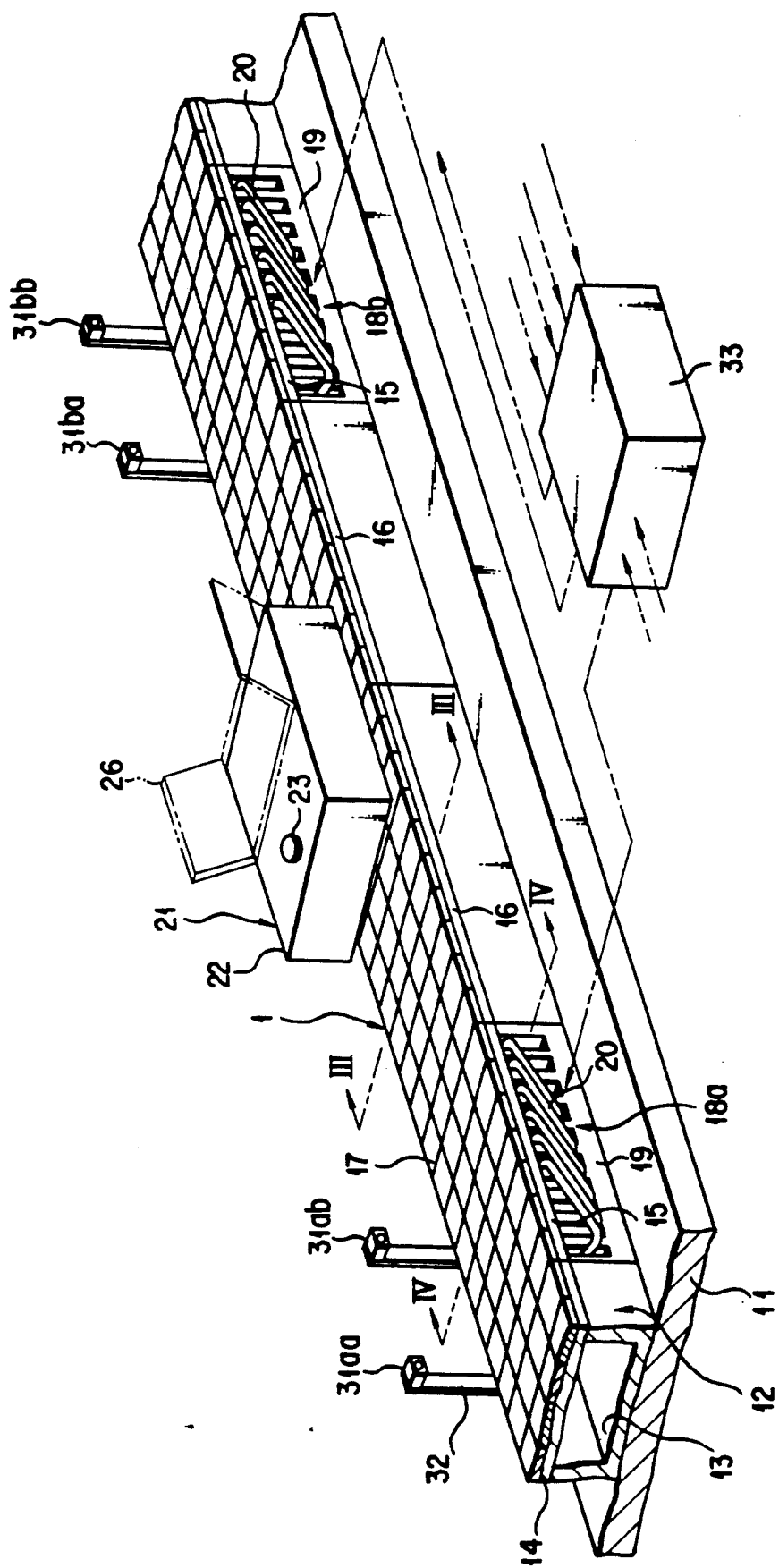
FIG. 1 is a perspective view showing the main part of a carrying apparatus according to the first embodiment of the present invention.

FIG. 1 shows the main part of a carrying apparatus according to the first embodiment of the present invention.

Reference numeral 11 denotes a base made of, e.g., a metal material. A track path 12 is formed on the base 11 to extend along a predetermined route to have a constant height and a constant width.

Figure 2:
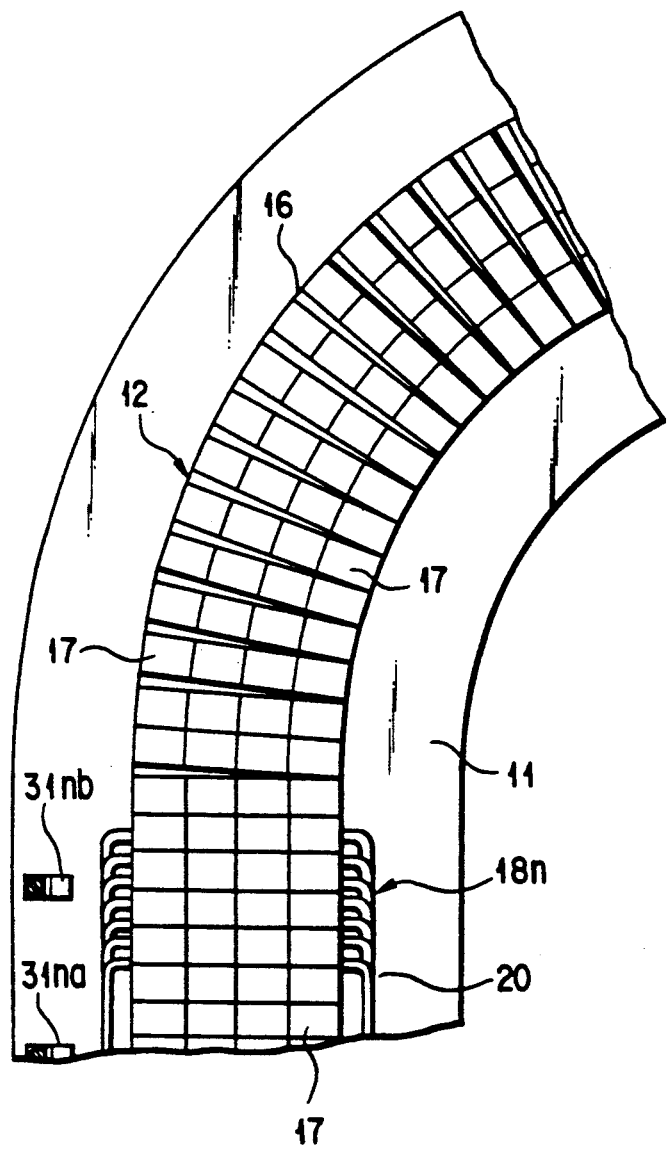
FIG. 2 is a plan view locally partially showing a curved portion of a track path of the carrying apparatus shown in FIG. 1.

The track path 12 is provided within a region determined by combining the linear portion shown in FIG. 1 and the curved portion shown in FIG. 2. The track path 12 is constituted by track base members 13 fixed to the base 11 and track surface plates 14 fixed on the upper surfaces of the track base members 13 by an adhesive or the like. Part of each track base member 13 is substituted by a stator core 19 of a linear induction motor to be described later. A portion of each track surface plate 14 located above the stator core 19 is constituted by a corresponding non-magnetic non-conductive plate member 15 made of, e.g., glass-epoxy, an acrylic resin, a phenol resin, and fiber reinforced plastics, and the other portion of the track surface plate 14 is constituted by a corresponding plate member 16, e.g., a magnetic steel plate. Note that the track base members 13 and the plate members 16 are divided each into a plurality of pieces in the extending direction of the track path 12.

Figure 3:
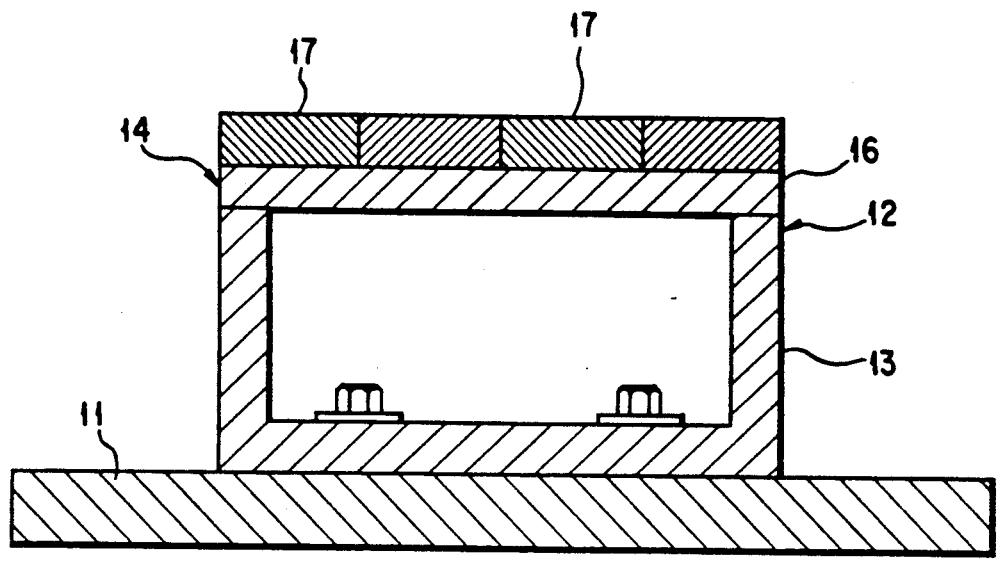
FIG. 3 is a sectional view taken along the line III-—III of FIG. 1.
Figure 4:
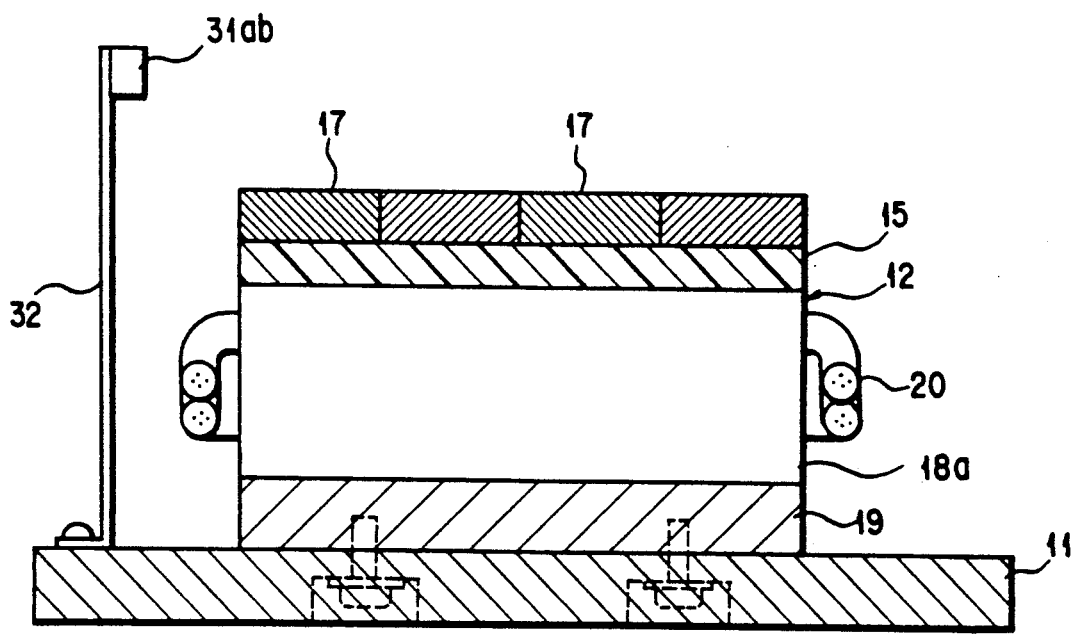
FIG. 4 is a sectional view taken along the line IV—IV of FIG. 1.
Figure 5:
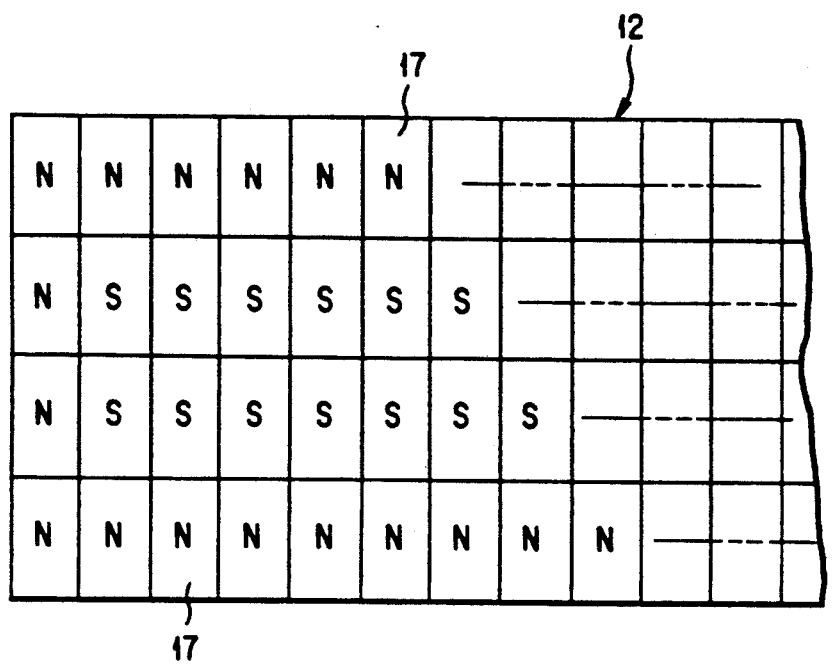
FIG. 5 is a plan view partially showing a path surface of the track path of the carrying apparatus shown in FIG. 1.

As shown in FIGS. 2, 3, and 4, a plurality of permanent magnets 17 are provided on the track surface plate 14 to generate a magnetic field having a predetermined magnetic flux distribution pattern in a direction perpendicular to the extending direction of the track path 12. Each permanent magnet 17 has a square shape. In this embodiment, four columns of permanent magnets 17 are arranged in the track surface plate 14. As shown in FIG. 5, the two central columns of the permanent magnets 17 exhibit S poles on their upper surfaces and the two outer columns of the permanent magnets 17 exhibit N poles on their upper surfaces. Note that the permanent magnets 17 located on the terminal portion of the track surface plate 14 exhibit N poles on their upper surfaces. Of these permanent magnets 17, those disposed on the plate members 15 are secured thereto by the adhesive force of an adhesive and the magnetic force acting upon the stators of a linear induction motor, hereinafter referred to, and those disposed on the plate members 16 are secured thereto by the adhesive force of the adhesive and the magnetic force acting upon the members 16.

Stators 18a, 18b, . . . of a linear induction motor are arranged below the track surface plate 14 to be set such that they serve also as part of the track base member 13. Each of the stators 18a, 18b, . . . comprises a slotted stator core 19 arranged below each plate member 15 to support the plate member 15 and a three-phase stator winding 20 mounted through the slot of the stator core 19.

Figure 6:
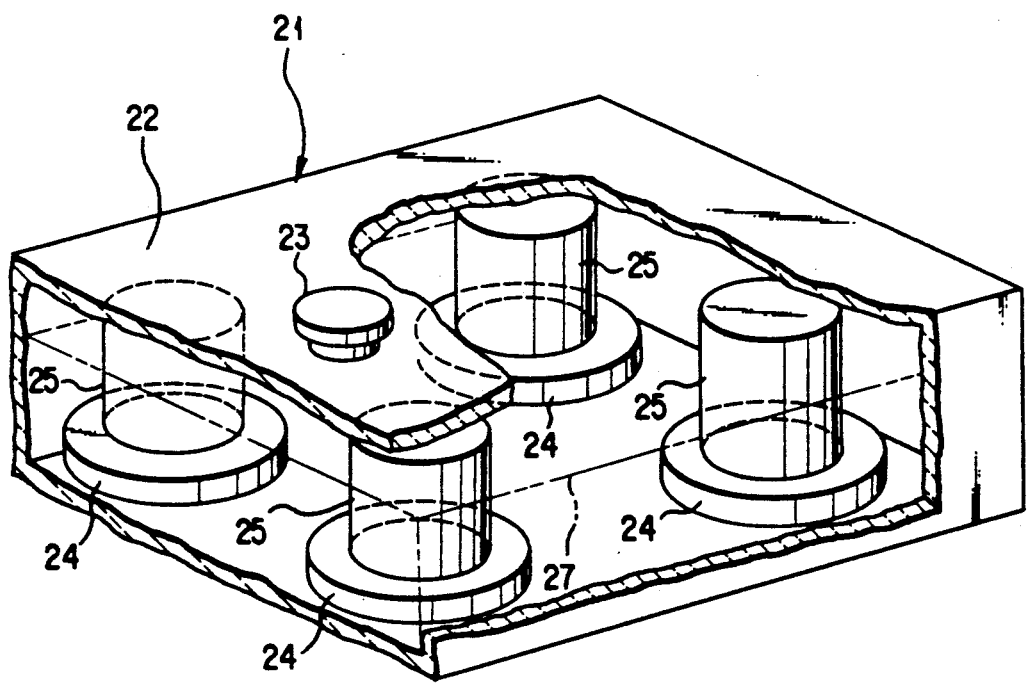
FIG. 6 is a partially cutaway perspective view showing the carrier of the carrying apparatus shown in FIG. 1.

A carrier 21 is arranged above the track path 12 to be movable along the track path 12. The carrier 21 comprises a non-magnetic, non-conductive, and heat-insulating container 22, a coolant inlet port 23 formed in the upper wall of the container 22, four superconductor elements 24 arranged on four corners of the bottom portion inside the container 22, and spring members 25, interposed between the superconductor elements 24 and the upper wall of the container 22, for fixing the superconductor elements 24 in the container 22, as shown in FIG. 6.

The container 22 is formed to have a width almost equal to that of the track path 12. A carriage plate 26 is selectively mounted on the upper wall of the container 22, as indicated by an alternate long and two short dashed line in FIG. 1.

Each superconductor element 24 is a disk-shaped element and is made of such a yttrium-based oxide ceramics as has a strong pinning force. To actually move the carrier 21, liquid nitrogen 27 is supplied into the container 22, and the superconductor element 24 is held at the superconducting state by the cooling operation of the liquid nitrogen 27.

Pairs of sensors 31aa and 31ab, 31ba and 31bb, . . . are arranged above the upper surface of the base 11 on a side of the stators 18a, 18b, . . . of the linear induction motor to detect the presence/absence of the carrier 21 in the non-contact manner. The sensors are fixed on L-shaped metal members 32, and the metal members 32 are fixed on the base 11. Note that the interval of the sensors of each pair is set slightly smaller than the total length of the carrier 21.

The input terminals of the respective stator windings wound on the stators 18a, 18b, . . . of the linear induction motor, and the output terminals of the paired sensors 31aa, 31ab, 31ba, 31bb, . . . are connected to a controller 33.

Figure 7:
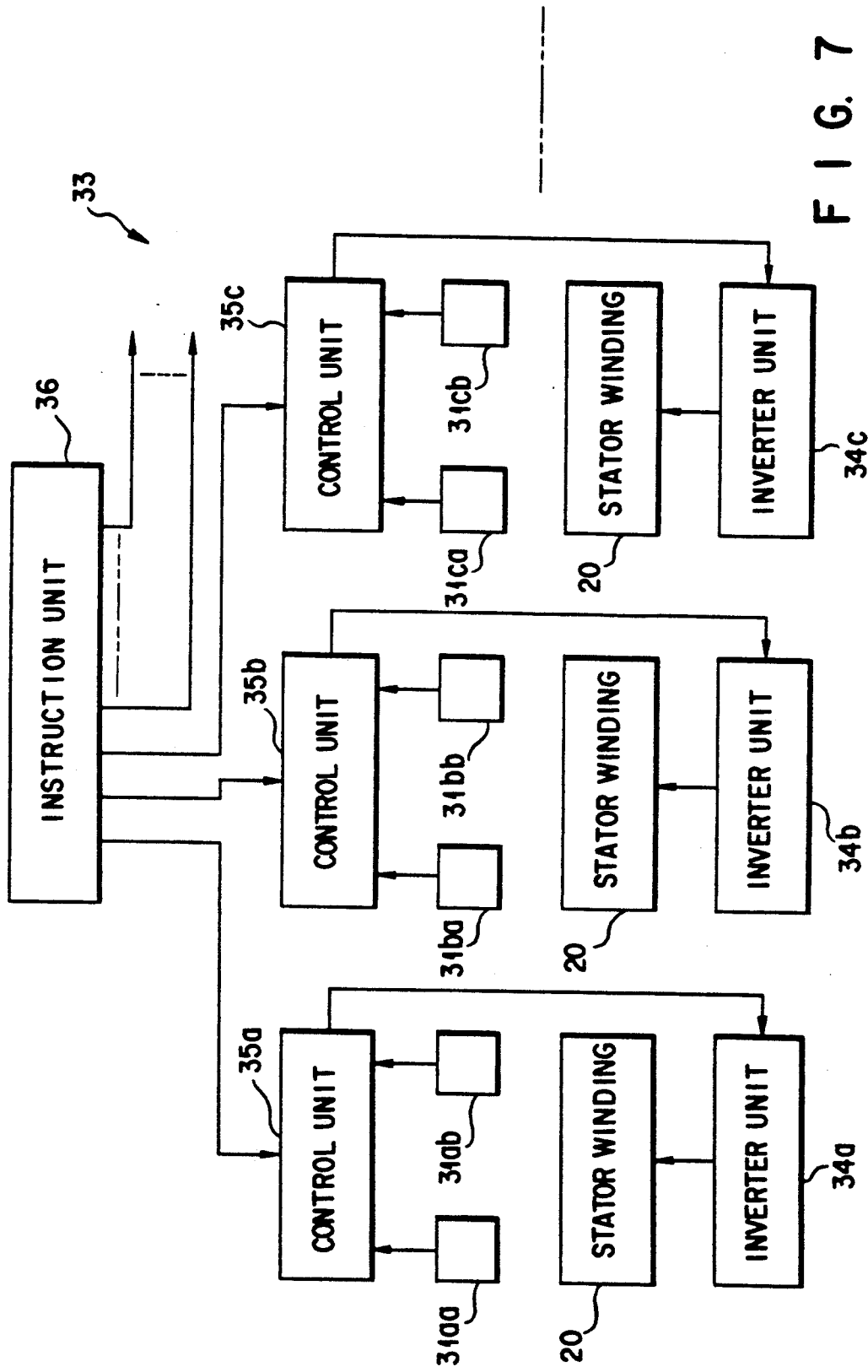
FIG. 7 is a block diagram of a travel controller of the carrying apparatus shown in FIG. 1.

The controller 33 has inverter units 34a, 34b, . . . corresponding in number to the stator windings 20, as shown in FIG. 7. The output terminals of the inverter units 34a, 34b, . . . are connected to the input terminals of the corresponding stator windings 20. The controller 33 also has control units 35a, 35b, . . . for receiving outputs from the paired sensors 31aa, 31ab, 31ba, 31bb, . . Upon reception of a start or stop instruction from an instruction unit 36, the control units 35a, 35b, . . . control outputs of the corresponding inverter units 34a, 34b, . . . on the basis of the signals from the corresponding sensors, and execute acceleration/deceleration and stop control of the carrier 21.

The operation of the carrying apparatus 1 having the arrangement as described above will be described.

Prior to travel of the carrier 21, the carrier 21 having the superconductor elements 24 therein is located above, e.g., the stator 18a of the linear induction motor. At this time, the respective superconductor elements 24 are set in the normal conducting state. The carrier 21 is lifted from the upper surface of the permanent magnets 17 to a predetermined height by an appropriate method and fixed at the lifted position.

Figure 8A:
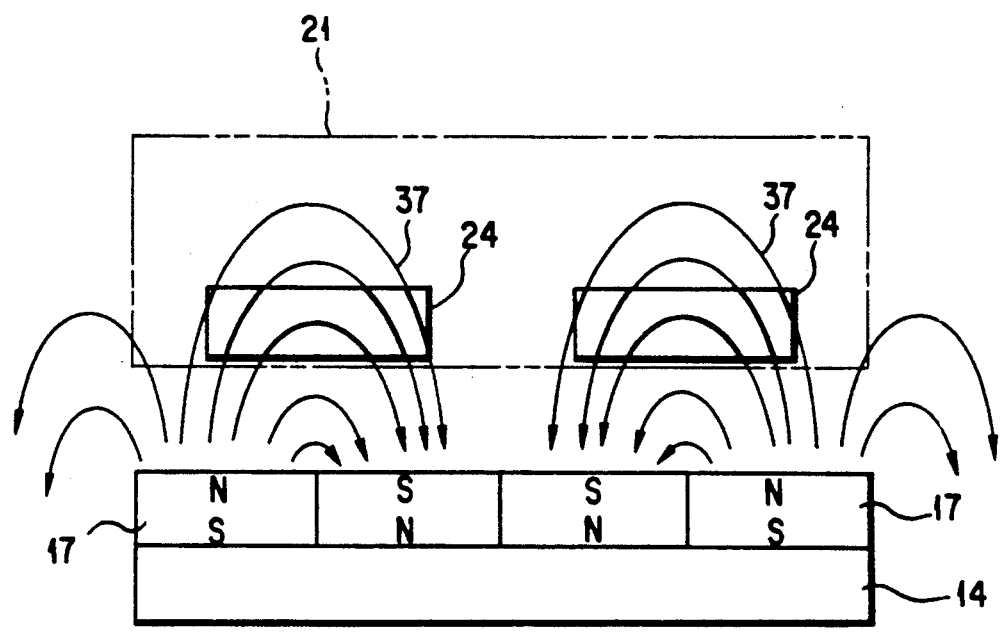
FIG. 8A is a schematic view showing a case in which a magnetic flux is pinned on a superconductor element mounted in the carrier of the carrying apparatus shown in FIG. 1.

At this time, some magnetic fluxes generated by the permanent magnets 17 provided on the track path 12 pass through the superconductor elements 24, as indicated by solid arrows 37 in FIG. 8A. In this state, the liquid nitrogen 27 is injected into the container 22 through the coolant inlet port 23. The state of the superconductor elements 24 is changed to the superconducting state by injection of the liquid nitrogen 27. Along with this state transition to the superconducting state, the magnetic flux 37 passing through the superconductor elements 24 is trapped in the superconductor elements 24 by the pinning effect. This trapped state continues until the state of the superconductor elements 24 is changed to the normal conducting state.

Figure 8B:
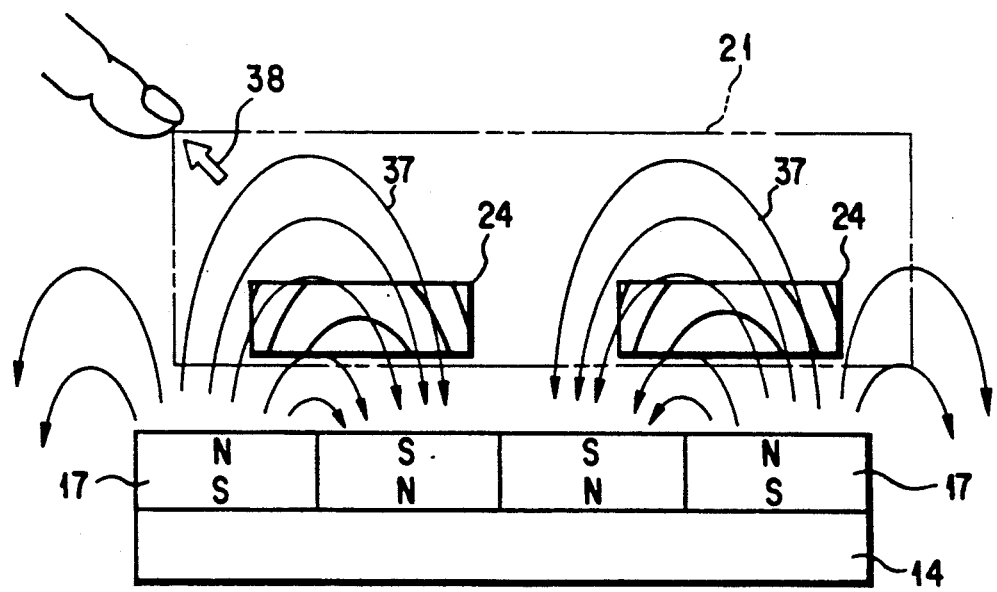
FIG. 8B is a schematic view for explaining a phenomenon in which a levitating force and a guiding force act on the carrier of the carrying apparatus shown in FIG. 1.

Subsequently, the fixing state of the carrier 21 is canceled. Then, the carrier 21 is levitated by the magnetic force to a near position where the density of the magnetic flux trapped in the respective superconductor elements 24 coincides with the density of the magnetic flux generated by the permanent magnets 17 and passing through the respective superconductor elements 24. This levitating state is much more stable than a case utilizing the Meissner effect. For example, even if an external force is applied to the carrier 21, as shown in FIG. 8B, a large anti-external force 38 to restore the carrier 21 to the initial position acts on the carrier 21. As a result, the carrier 21 stably levitates above the track path 12.

When a start instruction is supplied to the instruction unit 36, the instruction unit 36 supplies a start control signal to the control unit 35a. Based on this start control signal, the control unit 35a causes the inverter unit 34a to output a three-phase voltage having a predetermined frequency. This three-phase voltage is applied to the three-phase stator winding 20 of the stator 18a. As a result, the stator 18a is excited with a predetermined frequency to generate a shifting magnetic field.

When the shifting magnetic field is generated in this manner, a current to cancel the shifting magnetic field is induced in a lower part of the superconductor elements 24 mounted in the carrier 21, and the carrier 21 is started to travel by an electromagnetic force obtained by the mutual functions of the induced current and the shifting magnetic field. At this time, since the magnetic field is held in the superconductor elements 24 in the carrier 21 by the pinning effect, a large guide force matching the size of the track path 12 acts on the carrier 21. Thus, the carrier 21 levitates and travels without deviating from the track path 12.

The control unit 35a stops excitation of the stator winding 20 of the stator 18a when both the sensors 31aa and 31ab no longer detect the carrier 21, and completes start control.

The carrier 21 travels by inertia through a section where the stators 18a, 18b, . . . do not exist. When the carrier 21 approaches, e.g., the stator 18b located at a stop position and moves across the front surface of the sensor 31ba, the control unit 35b performs stop control as follows.

Figure 9:
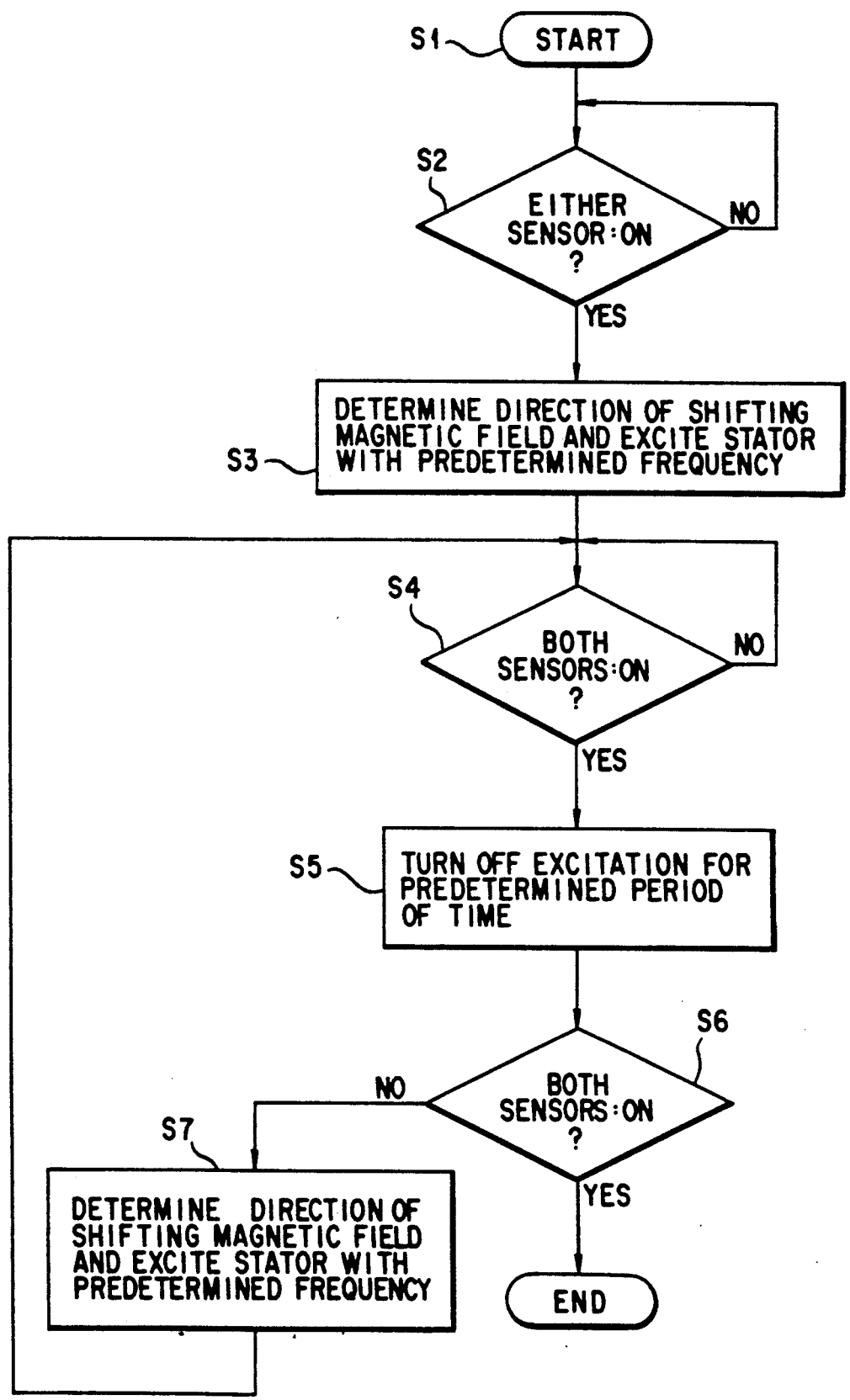
FIG. 9 is a flow chart showing a stop control operation of the carrying apparatus shown in FIG. 1.

That is, when a stop instruction is output to start stop control ($S_1$), as shown in FIG. 9, it is determined whether either one of the pair of sensors 31ba and 31bb has detected the carrier 21 ($S_2$). The stator winding 20 of the stator 18b is excited with the output from the inverter unit 34b in order to generate a shifting magnetic field that shifts at a predetermined speed from the sensor not detecting the carrier 21 toward the sensor detecting the carrier 21 ($S_3$). By this control, the carrier 21 starts deceleration. Subsequently, whether both the sensors 31ba and 31bb detect the carrier 21 simultaneously is determined in order to check whether the carrier 21 has traveled to a stop position ($S_4$). Excitation is stopped for a predetermined period of time to confirm that the carrier 21 has stopped ($S_5$), and thereafter it is determined whether both the sensors 31ba and 31bb detect the traveling carrier 21 simultaneously ($S_6$). If the carrier 21 is not located at the stop position, the stator winding 20 of the stator 18b is excited by the output from the inverter unit 34b in order to generate a shifting magnetic field that shifts from the sensor detecting the carrier 21 toward the sensor not detecting the sensor ($S_7$). By this control, the carrier 21 is returned to the stop position. In this manner, when it is confirmed ($S_6$) that the carrier 21 is located at the stop position, excitation of the stator winding 20 is stopped, and stop control is completed.

As described above, since the superconductor elements 24 are loaded in the carrier 21 and since the magnetic flux distribution similar to that formed by the permanent magnets 17 provided on the track path 12 is held in the superconductor elements 24 by pinning, a large levitating force and a large guide force can be applied to the carrier 21, and the carrier 21 can be levitated to travel so as not to deviate from the track path 12.

In this embodiment, the stators 18a, 18b, . . . of the linear induction motor are arranged below the track surface of the track path 12, and a propelling force is applied to the carrier 21 by using the shifting magnetic field generated by the stators 18a, 18b, . . . As a result, a sufficient propelling force can be applied to the carrier 21 with a simple arrangement, and the carrier 21 can be stably moved at a desired speed.

In this embodiment, the permanent magnets 17 arranged above the stators 18a, 18b, . . . of the linear induction motor are mounted on the non-magnetic, non-conductive plate members 15 by using the adhesive. As a result, the shifting magnetic field generated by the stators 18a, 18b, . . . is not attenuated by the plate members 15, and the shifting magnetic field can be effectively applied to the superconductor elements 24. The plate members 15 enable employment of permanent magnets each having a width smaller than the slot of the stator core 19, and contributes to improvement in flatness precision of the track surface. When each plate member 15 is made of glass-epoxy, as in this embodiment, since the glass-epoxy has sufficiently high durability and a sufficiently high strength, when the plate members 15 on which the permanent magnets 17 are adhered are to be mounted on the corresponding stator core 19, the plate members 15 are prevented from being damaged by the magnetic attractive force acting between the permanent magnets 17 and the stator core 19.

Regarding the permanent magnets 17 located above the stators 18a, 18b, . . . of the linear induction motor, as in this embodiment, if they are to be attracted and fixed on the upper surface of the corresponding plate member 16 constituted by a magnetic steel plate by its own attractive force, they can be fixed without waiting for hardening of the adhesive, greatly facilitating the manufacture.

In this embodiment, because of the presence of the plate members 16 each constituted by the magnetic member and the presence of the stator cores 19 of the stators 18a, 18b, . . . , the magnetic member exists throughout the entire portion of the track path 12. As a result, the magnetic field distributions formed by the permanent magnets 17 on the track surface can be set substantially equal to each other, and thus the carrier 21 can be smoothly levitated and traveled. Further, the plate members 16 and stator cores 19 concentrate the magnetic flux generated by the permanent magnets 17, thereby weakening the magnetic field around the track path 12, so that the influence of the magnetic field around the track path can be reduced.

If the track path 12 is constituted by the combination of the plurality of stators 18a, 18b, . . . and the plurality of divided plate members 15 and 16, as in this embodiment, the respective elements can be manufactured simultaneously, thus greatly shortening provided along a predetermined route, the track can be installed by divided portions, facilitating track installation in a small area.

If permanent magnets 17a are to be arranged at a predetermined gap, as indicated by a track path of a carrying apparatus 1a according to the second embodiment shown in FIG. 10, the attractive force and the repulsive force can be decreased, and the permanent magnets 17a can be easily mounted on plate members 15 and 16.

FIG. 11 shows the main part of a carrying apparatus 1b according to the third embodiment of the present invention. Note that the same portions as in FIG. 1 are denoted by the same reference numerals, and a detailed description of the overlapping portions will accordingly be omitted.

The carrying apparatus 1b shown in FIG. 11 is different from the carrying apparatus 1 shown in FIG. 1 in that a pinning processing mechanism 41 is provided at the terminal end portion of a track path 12.

The pinning processing mechanism 41 pins the magnetic flux on superconductor elements 24 mounted in a carrier 21. The pinning processing mechanism 41 comprises a pinning magnetic field generating portion 42 constituted by a plurality of permanent magnets, a non-magnetic spacer 43, disposed on the upper surface of the pinning magnetic field generating portion 42, for maintaining the height of the upper surface of the pinning processing mechanism 41 to be the same as that of permanent magnets 17 on the track path 12, and a magnet support plate 44 and a seat 45 interposed between the pinning magnetic field generating portion 42 and a base 11.

The pinning magnetic field generating portion 42 is constituted by a plurality of permanent magnets 46, each made of the same material as the permanent magnets 17 and having the equal height and width, arranged on the upper surface of the magnet support plate 44. The permanent magnets 46 are fixed on the magnet support plate 44 with an adhesive.

The permanent magnets 46 are arranged such that those located at the central portion exhibit S poles on their upper surfaces and those located on the outer side to surround the central ones exhibit N poles on their upper surfaces, as shown in FIG. 12. With this arrangement, a magnetic potential gradient is formed at boundary portions C and C' between the end portion of the track path 12 and the pinning magnetic field generating portion 42, as shown in FIG. 12. When a carrier 21 located on the track path 12 approaches the portion C, the magnetic potential gradient supplies the carrier 21 with a force to return to the track path 12. This prevents the carrier 21 from erroneously entering on the pinning processing mechanism 41. Even if a carrier 21 in which pinning of the magnetic flux has completed is erroneously going to enter the track path 12 from the pinning processing mechanism 41, the magnetic potential gradient supplies a force to this carrier 21 to return it to the pinning processing mechanism 41 at a region including the portion C'. Since the same magnetic potential gradient as this is given to the terminal end of the pinning processing mechanism 41, the carrier 21 is prevented from dropping from the terminal end of the pinning processing mechanism 41.

When superconductor elements 24 mounted in the carrier 21 are in the normal conducting state, if the carrier 21 is located on the pinning processing mechanism 41, the pinning processing mechanism 41 having the arrangement as described above applies a magnetic field to the superconductor elements 24 such that the magnetic flux density through the superconductor elements 24 becomes smaller than that measured at the same positions when the carrier 21 is located on the track path 12.

In the carrying apparatus 1b having the arrangement as described above, prior to causing the carrier 21 to travel, the carrier 21 having the superconductor elements 24 therein in the normal conducting state are located on the spacer 43 of the pinning processing mechanism 41. At this time, magnetic flux generated by the permanent magnets 46 passes through the superconductor elements 24 mounted in the carrier 21. In this state, liquid nitrogen is injected into a container 22 through a coolant inlet port 23 to change the state of the superconductor elements 24 to the superconducting state. As a result, the magnetic field entering the superconductor elements 24 is pinned in the superconductor elements 24.

After the above procedures, the carrier 21 is moved toward the track path 12 by an appropriate means. In this case, since the magnetic field applied by the permanent magnets 17 on the track path 12 is stronger than that applied by the pinning processing mechanism 41, the carrier 21 is levitated by the magnetic force at a height where a magnetic flux density having substantially the same intensity as that of the density of the magnetic flux pinned in the superconductor elements 24 can be obtained.

Then, the carrier 21 can be levitated and traveled by energizing a stator 18a by a controller in the same manner as in the embodiment shown in FIG. 1.

In this manner, in the carrying apparatus 1b according to the third embodiment, the pinning processing mechanism 41 is provided continuous to the track path 12 to have the same height, and the magnetic field providing the above-mentioned magnetic flux density is applied by the pinning processing mechanism 41 to the superconductor elements 24 to pin the magnetic flux. As a result, even if the carrier 21 is large, it can be handled easily.

Figure 13:
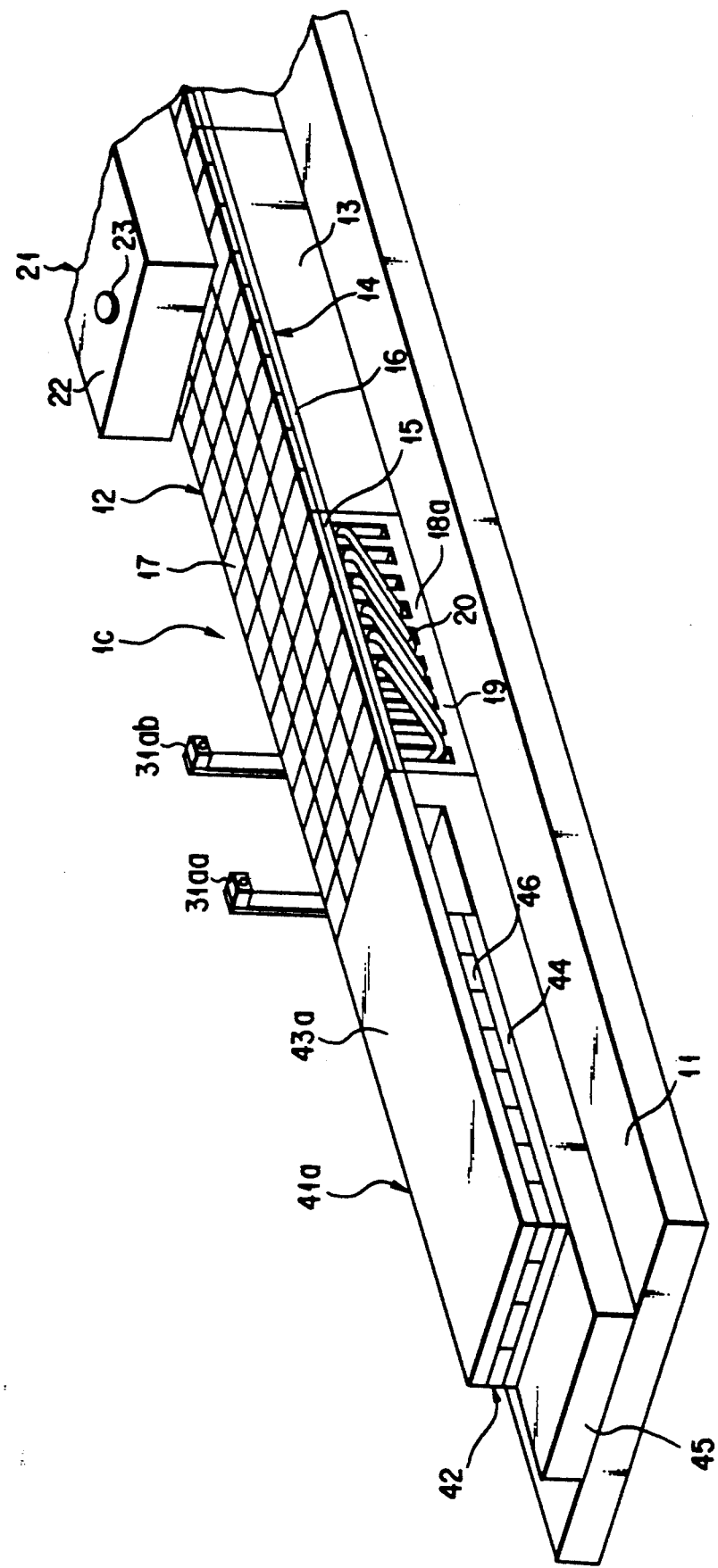
FIG. 13 is a perspective view showing the main part of a carrying apparatus according to the fourth embodiment of the present invention.

FIG. 13 shows the main part of a carrying apparatus 1c according to the fourth embodiment of the present invention. In FIG. 13, the same portions as in FIG. 11 are denoted by the same reference numerals, and a detailed description of the overlapping portions will accordingly be omitted.

The carrying apparatus 1c of the fourth embodiment is different from the carrying apparatus 1b shown in FIG. 11 in the arrangement of a pinning processing mechanism 41a.

In the pinning processing mechanism 41a, an elongated spacer 43a is arranged to extend from the upper surfaces of permanent magnets 17 provided on a track path 12, and a pinning magnetic field generating portion 42 and a magnet support plate 44 are arranged under the spacer 43a on the side of the free end portion. That is, a place used for actual pinning is spaced apart from the track path 12.

With this arrangement, even if a carrier 21 traveling on the track path 12 is erroneously going to enter the pinning processing mechanism 41a, it contacts the spacer 43a and is stopped before the pinning magnetic field generating portion 42. Accordingly, even if another carrier is present on the pinning magnetic field generating portion 42, collision of the two carriers can be prevented.

Figure 14:
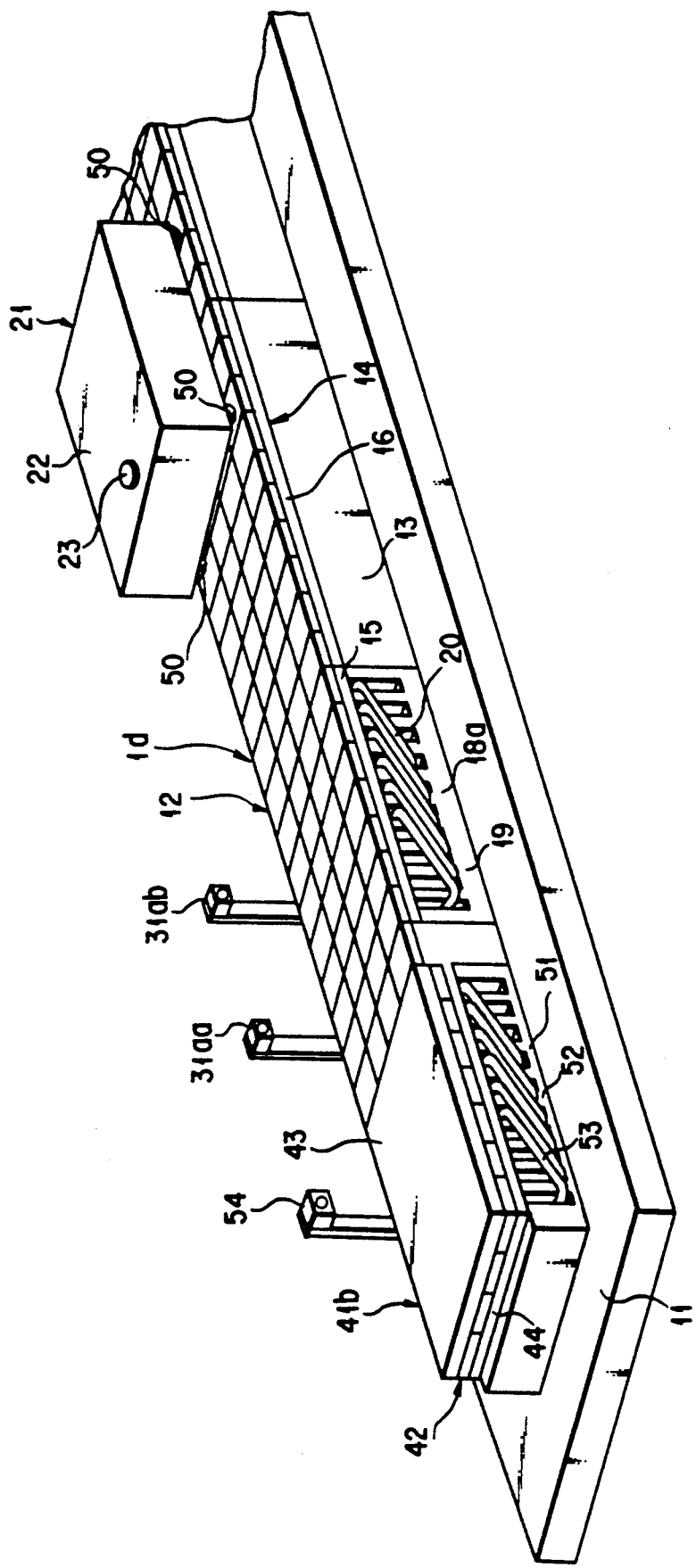
FIG. 14 is a perspective view showing the main part of a carrying apparatus according to the fifth embodiment of the present invention.

FIG. 14 shows the main part of a carrying apparatus 1d according to the fifth embodiment of the present invention. In FIG. 14, the same portions as in FIG. 11 are denoted by the same reference numerals, and a detailed description of the overlapping portions will accordingly be omitted.

The carrying apparatus 1d of the fifth embodiment is different from the carrying apparatus 1b shown in FIG. 11 in the arrangement of a pinning processing mechanism 41b.

The pinning processing mechanism 41b can pin the magnetic flux on superconductor elements 24 mounted in a carrier 21, and thereafter can move the carrier 21 onto a track path 12 by a magnetic force.

More specifically, in the fifth embodiment, wheels 50 are provided on four corners of the lower surface of the carrier 21, and a stator 51 of a linear induction motor is arranged below a pinning magnetic field generating portion 42. The stator 51 comprises a slotted stator core 52 having its magnetic pole surface facing upward, and a three-phase stator winding 53 mounted through the slot of the stator core 52. The input terminal of the stator winding 53 is connected to an inverter unit (not shown). A sensor 54 for detecting whether the carrier is located on the pinning processing mechanism 41b in the non-contact manner is arranged on a base 11 beside the pinning processing mechanism 41b.

In the carrying apparatus 1d having the arrangement as described above, after the carrier 21 is positioned on the pinning processing mechanism 41b and the magnetic flux is pinned on the superconductor elements 24 mounted in the carrier 21, when the stator 51 is excited, a propelling force can be supplied to the carrier 21 by the generated shifting magnetic field, and the carrier 21 can be moved onto the track path 12 by the propelling force. When it is confirmed from the output from the sensor 54 that the carrier 21 has moved onto the track path 12, excitation of the stator 51 is stopped.

With this arrangement, the carrier 21 can be automatically smoothly moved onto the track path 12.

Figure 15:
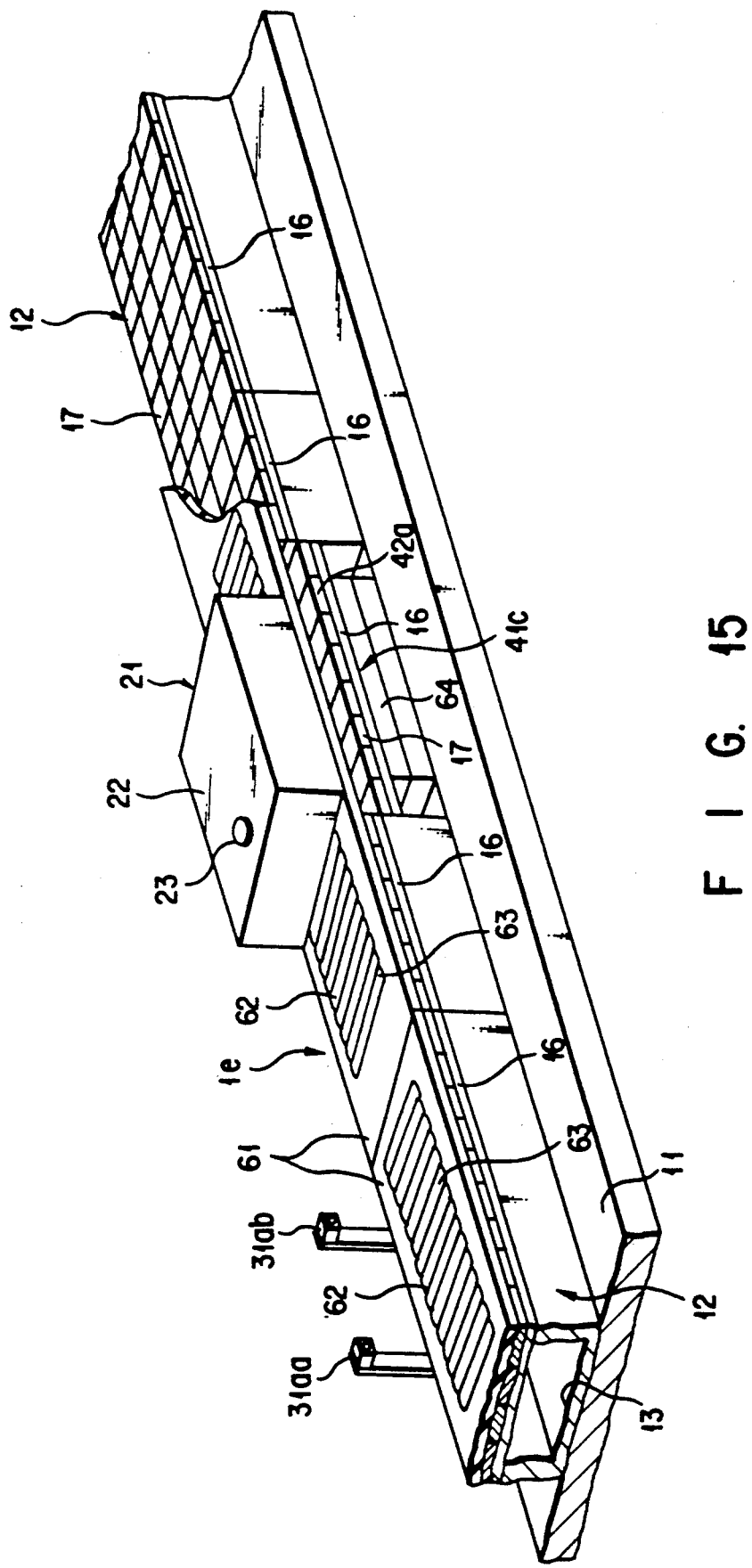
FIG. 15 is a perspective view showing the main part of a carrying apparatus according to the sixth embodiment of the present invention.

FIG. 15 shows the main part of a carrying apparatus 1e according to the sixth embodiment of the present invention. In FIG. 15, the same portions as in FIG. 11 are denoted by the same reference numerals, and a detailed description of the overlapping portions will accordingly be omitted.

The carrying apparatus 1e of the sixth embodiment is different from the carrying apparatus 1b shown in FIG. 11 in the position and arrangement of a means for supplying a propelling force to a carrier 21 and a pinning processing mechanism 41c.

In this embodiment, insulating plates 61 are arranged on permanent magnets 17 placed on a track path 12, and three-phase coils 62 are provided on the upper surfaces of the respective insulating plates 61 in the form of printed circuits in place of stators of a linear induction motor, thereby constituting respective stators 63 of the linear synchronous motor.

The pinning processing mechanism 41c is installed midway along the track path 12, and some of the permanent magnets 17 placed on the track path 12 are also used as a pinning magnetic field generating portion. That is, in the pinning processing mechanism 41c, some of the permanent magnets 17 are fixed on the upper surface of a vertically extendible actuator 64, and the fixed permanent magnets 17 constitute a pinning magnetic field generating portion 42a. Hence, an insulating plate 61 located above the pinning magnetic field generating portion 42a constitutes a bridge.

To pin the magnetic flux on the superconductor elements 24 mounted in the carrier 21, it is performed by retracting the actuator 64 to lower the pinning magnetic field generating portion 42a. After the magnetic flux is pinned, the actuator 64 is extended to lift the permanent magnets 17 on the pinning magnetic field generating portion 42a to the same height as other permanent magnets 17 provided on the track path 12. Accordingly, the carrier 21 is levitated from the upper surface of the insulating plate 61 constituting the bridge. As a result, if the three-phase coils 62 of the stators 63 of the linear synchronous motor are excited with a predetermined frequency, the carrier 21 can be traveled at a synchronous speed.

FIG. 16 shows a modification of the pinning processing mechanism.

A pinning processing mechanism 41d is arranged aside a track path 12. A plurality of rollers 72 driven by a motor 71 are aligned parallel to each other in the upper portion of the pinning processing mechanism 41d in a direction perpendicular to the extending direction of the track path 12. Each roller 72 is constituted by a non-magnetic member and its upper end slightly projects from the upper surfaces of permanent magnets 17 provided on the track path 12. A plurality of permanent magnets 73 constituting a pinning magnetic field generating portion 42b are arranged under the rollers 72.

That is, in this embodiment, a carrier 21 after pinning is moved onto the track path 12 by using a so-called roller type track mechanism 74 constituted by the respective elements described above.

With this arrangement, the route of the track path 12 can be formed in a loop. A so-called belt conveyor type track mechanism 76 having an endless belt 75 covering rollers 72 can be used in place of the roller type track mechanism 74, as shown in FIG. 17.

The present invention is not limited to the embodiments described above. That is, in the embodiments described above, disk-shaped superconductor elements are mounted in the carrier. However, the shape of the superconductor element is not limited to this. For example, superconductor elements 24a each having a coiled shape, as shown in FIG. 18, can be each shaped like a polygonal prism (and having a coiled shape), mounted. The superconductor element can be of any shape. When the superconductor elements are formed to have a coiled shape, a current flows through the coils to maintain constant the magnetic flux flowing through the coils, and a levitating force and a guide force larger than those obtained by the Meissner effect can be obtained, in the same manner as a case in which the pinning effect is used. The means for fixing the superconductor elements in the container need not be spring members. The superconductor elements may be fixed by an adhesive or other fixing means.

In the embodiments described above, a plurality of permanent magnets are aligned on the track path such that those on the two central columns exhibit S poles on their upper surfaces and those on the outer columns, one column on each side, exhibit N poles on their upper surfaces, thereby constituting the so-called track path side magnetic field generating unit. Further, in the track path 12 curved as shown in FIG. 2, since the space between each adjacent pair of the permanent magnets 17 arranged on a radially outside portion of the curved track path is larger than that between each adjacent pair of the magnets 17 arranged on a radially inside portion of the same, the concentration of the magnetic flux on the outside portion of the track path 12 is weaker than that on the inside portion, if the magnets 17 have the same magnetic force. To avoid this, as is shown in FIG. 19A, fan-shaped magnets 17 may be employed so as to make constant the space between each adjacent pair of the magnets. Alternatively, as is shown in FIG. 19B, in curved portions of the track path, the magnets 17 may be arranged such that the thicknesses of the magnets increase from those of the curved portions which have the largest curvature, to those which have the smallest curvature, thereby adjusting the magnetic flux density due to the magnets to a substantially equal value, thus obtaining a uniform flux concentration on the track path 12. However, the shape, material, arrangement, and the like of the magnetic field generating unit are not limited as far as they can levitate a carrier by the pinning effect.

Although four superconductor elements are mounted in the carrier in each of the embodiments described above, the number of superconductor elements is not limited to four.

In the embodiments shown in FIGS. 1 to 14, the stators of the linear induction motors are discontinuously provided in an extending direction of the track path. However, the arrangement of the stators is not limited to this, and stators may be provided along the entire width of the track path.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A carrying apparatus comprising:
   a track path having a track surface;
   magnetic field generating means, provided along said track surface of said track path, for generating, along said track surface, a magnetic field having a predetermined magnetic flux distribution pattern in a direction perpendicular to an extending direction of said track path;
   a carrier movably arranged on said track surface of said track path;
   at least one superconductor element mounted in said carrier, said superconductor element trapping a magnetic flux of a magnetic field applied during transition from a normal conducting state to a superconducting state and supplying a levitating force and a guide force acting in a direction perpendicular to the extending direction of said track path to said carrier by a magnetic force generated between the trapped magnetic flux and the magnetic field generated by said magnetic field generating means; and
   propelling means for supplying a moving force to said carrier in a direction of said track path in a non-contact manner.

2. An apparatus according to claim 1, wherein said magnetic field generating means is constituted by a plurality of permanent magnets placed on said track path.

3. An apparatus according to claim 2, wherein said permanent magnets are supported by magnetic plate members.

4. An apparatus according to claim 2, wherein those of said permanent magnets which are located on curved portions of said track path are arranged such that the thicknesses of said permanent magnets increase from those of said curved portions which have the largest curvature, to those of said curved portions which have the smallest curvature.

5. An apparatus according to claim 2, wherein said permanent magnets are placed to have a gap between adjacent ones thereof.

6. An apparatus according to claim 1, wherein said superconductor element is applied with the magnetic field generated by said magnetic field generating means during the transition from the normal conducting state to the superconducting state and traps the magnetic flux flowing through said superconductor element.

7. An apparatus according to claim 1, wherein said superconductor element is applied with a magnetic field generated by means different from said magnetic field generating means during the transition from the normal conducting state to the superconducting state and traps the magnetic flux flowing through said superconductor element.

8. An apparatus according to claim 1, wherein said superconductor element is made of a yttrium-based oxide superconductor material.

9. An apparatus according to claim 1, wherein said carrier comprises a non-magnetic heat-insulating container for housing said superconductor element and a coolant for cooling said superconductor element.

10. An apparatus according to claim 1, wherein said propelling mean includes shifting magnetic field generating means provided along said track path, and supplies a moving force to said carrier by an interaction between an induced current, induced in said superconductor element by a shifting magnetic field generated by said shifting magnetic field generating means, and the shifting magnetic field.

11. An apparatus according to claim 10, wherein said shifting magnetic field generating means includes stators of a linear induction motor comprising stator cores arranged continuously or discontinuously below said track surface of said track path and stator windings wound on said stator cores.

12. An apparatus according to claim 10, wherein said shifting magnetic field generating means includes printed circuit wirings, arranged continuously or discontinuously along said track surface of said carrying apparatus, for generating a shifting magnetic field upon being excited.

13. A carrying apparatus comprising:
a track path having a track surface;
magnetic field generating means, provided along said track surface of said track path, for generating, along said track surface, a magnetic field having a predetermined magnetic flux distribution pattern in a direction perpendicular to an extending direction of said track path;
a carrier movably arranged on said track surface of said track path;
at least one superconductor element mounted in said carrier, said superconductor element trapping a magnetic flux of a magnetic field applied during transition from a normal conducting state to a superconducting state and supplying a levitating force and a guide force acting in a direction perpendicular to the extending direction of said track path to said carrier by a magnetic force generated between the trapped magnetic flux and the magnetic field generated by said magnetic field generating means;
propelling means for supplying a moving force to said carrier in a direction of said track path in a non-contact manner; and
trapping means, provided close to said track path, for causing said superconductor element to trap the magnetic flux.

14. An apparatus according to claim 13, wherein said magnetic field generating means is constituted by a plurality of permanent magnets placed on said track path.

15. An apparatus according to claim 14, wherein said permanent magnets are supported by magnetic plate members.

16. An apparatus according to claim 14, wherein said permanent magnets are placed to have a gap between adjacent ones thereof.

17. An apparatus according to claim 13, wherein said superconductor element is made of a yttrium-based oxide superconductor material.

18. An apparatus according to claim 13, wherein said carrier comprises a non-magnetic heat-insulating container for housing said superconductor element and a coolant for cooling said superconductor element.

19. An apparatus according to claim 13, wherein said propelling means includes shifting magnetic field generating means provided along said track path, and supplies the propelling force to said carrier by an interaction between an induced current, induced in said superconductor element by a shifting magnetic field generated by said shifting magnetic field generating means, and the shifting magnetic field.

20. An apparatus according to claim 13, wherein said shifting magnetic field generating means includes stators of a linear induction motor comprising stator cores arranged continuously or discontinuously below said track surface of said track path and stator windings wound on said stator cores.

21. An apparatus according to claim 13, wherein said shifting magnetic field generating means includes printed circuit wirings, arranged continuously or discontinuously along said track surface of said track path, for generating a shifting magnetic field upon being excited.

22. An apparatus according to claim 13, wherein said trapping means includes an actuator for moving some of said permanent magnets constituting said magnetic field generating means in a direction perpendicular to said track surface.

23. An apparatus according to claim 13, wherein said trapping means comprises a plurality of trapping magnetic field generating permanent magnets arranged adjacent to said track path in the same manner as said permanent magnets constituting said magnetic field generating means, and a track mechanism, arranged above said trapping magnetic field generating permanent magnets, for moving said carrier toward said track path.

24. An apparatus according to claim 13, wherein said trapping means comprises a plurality of trapping magnetic field generating permanent magnets arranged adjacent to said track path in the same manner as said permanent magnets constituting said magnetic field generating means, and shifting magnetic field generating means, arranged below said trapping magnetic field generating permanent magnets, for moving said carrier toward said track path by an interaction between the induced current induced in said superconductor element by the generated shifting magnetic field and the shifting magnetic field.

25. A carrying apparatus comprising:
a track path having a track surface;
a plurality of permanent magnets, provided along said track surface of said track path, for generating, along said track surface, a magnetic field having a predetermined magnetic flux distribution pattern in a direction perpendicular to an extending direction of said track path;
a carrier movably arranged on said track surface of said track path;
at least one superconductor element mounted in said carrier, said superconductor element trapping a magnetic flux of a magnetic field applied during transition from a normal conducting state to a superconductor state and supplying a levitating force and a guide force acting in a direction perpendicular to the extending direction of said track path to said carrier by a magnetic force generated between the trapped magnetic flux and the magnetic field generated by said magnetic field generating means;

stators of a linear induction motor, including stator cores arranged discontinuously below said track surface and stator windings wound on said stator cores, for supplying a propelling force to said carrier by an interaction between an induced current induced in said superconductor element by a shifting magnetic field generated when said stator windings are selective excited and the shifting magnetic field;

a non-magnetic, non-conductive plate member for supporting, of said permanent magnets, those located on said stator cores; and a magnetic plate member for supporting, of said permanent magnets, those located on other than said stator cores.

26. An apparatus according to claim 25, wherein said non-magnetic, non-conductive plate member is made of epoxy-glass.

* * * * *